United States Patent [19]

Shimizu

[11] Patent Number: 4,620,245
[45] Date of Patent: Oct. 28, 1986

[54] TAPE LOADING APPARATUS FOR USE IN A RECORDING AND/OR REPRODUCING APPARATUS OF THE ROTATING HEAD KIND

[75] Inventor: Osamu Shimizu, Kanagawa, Japan
[73] Assignee: Sony Corporation, Tokyo, Japan
[21] Appl. No.: 606,151
[22] Filed: May 2, 1984
[30] Foreign Application Priority Data May 16, 1983 [JP] Japan ................... 58-85596

[51] Int. Cl.$^4$ ............................................. G11B 15/66
[52] U.S. Cl. ...................................................... 360/85
[58] Field of Search ......................................... 360/85

[56] References Cited

U.S. PATENT DOCUMENTS 4,126,888 11/1978 Hayashi et al. ...................... 360/85
4,410,919 10/1983 Umeda ................................. 360/85

Primary Examiner—Tupper Robert S.
Attorney, Agent, or Firm—Lewis H. Eslinger; Alvin Sinderbrand

[57] ABSTRACT

A tape loading apparatus in which a tape is extracted from a tape cassette and wound around a rotary head drum by a pair of tape guide blocks. The tape guide blocks are moved along a pair of guide rails arranged around both sides of the rotary head drum by being driven through a pair of ring gears. At least one of the guide rails is inclined with respect to a plane perpendicular to the axis of the rotary head drum in order that the pair of tape guide blocks have a level difference at the tape-loaded positions thereof.

A parallel movement mechanism is provided for moving at least one of ring gears along the axis of the rotary head drum so that the level relationships between the tape guide blocks and the ring gears are substantially kept constant while the pair of ring gears rotate in the opposite directions to each other.

4 Claims, 12 Drawing Figures

TAPE LOADING APPARATUS FOR USE IN A RECORDING AND/OR REPRODUCING APPARATUS OF THE ROTATING HEAD KIND

BACKGROUND OF THE INVENTION

1. Field of the Invention

The present invention relates to a tape loading apparatus suitably applied to a mgnetic recording/reproducing apparatus such as a cassette-type video tape recorder and, more particularly, to a tape loading apparatus for extracting a tape from a tape cassette by a pair of tape guide blocks which are moved along both sides of a rotary head drum so as to helically wind the tape around the rotary head drum in a substantially Ω-shaped manner.

2. Description of the Prior Art

The present inventor has examined a conventional tape loading apparatus shown in FIGS. 1 to 3 to devise the present invention.

In this conventional tape loading apparatus, a magnetic tape (hereinafter, described only as "tape" for brevity) 5 is extracted from a tape cassette 4 by a pair of tape guide blocks (hereinafter, each described only as "guide block") 2 and 3 which can be moved along both sides, of a rotary head drum (hereinafter, described only as "drum") 1. The extracted tape is helically wound around the outer surface of the drum 1 for an angular interval of nearly 360° in a substantially Ω-shaped manner.

The specific construction of this tape loading apparatus will be described.

Each of the pair of guide blocks 2 and 3 comprises a tape guide 8 constituted by a fixed pin and a pair of tape guides 9 and 10 constituted by rollers. The tape guides 8, 9 and 10 are mounted on a corresponding carrier 7 in a triangular arrangement as shown in FIG. 1.

The drum 1 is vertically mounted on a chassis 11. A pair of guide rails 12 and 13 are disposed around both sides of the drum 1 to guide the guide blocks 2 and 3, respectively. The guide rails 12 and 13 comprise substantially J-shaped plates arcuated along the outer circumference of the drum 1 and are arranged symmetrically with each other about the drum 1. Guide grooves 14 are formed at the central portions of the guide rails 12 and 13 along their longitudinal directions. The guide blocks 2 and 3 are placed on the guide rails 12 and 13 through the carriers 7, respectively. A pair of guide pins 15 and 16 are fixed on the lower surface of each carrier 7 at positions spaced apart from each other and they are fitted in the corresponding one of guide grooves 14. Therefore, the guide blocks 2 and 3 are slidably guided by the guide grooves 14 of the guide rails 12 and 13, respectively. In particular, the guide blocks 2 and 3 can be moved along both sides of the drum 1 between the original positions indicated by imaginary lines in FIGS. 1 and 2 and tape-loaded positions indicated by solid lines in FIGS. 1 and 2.

A pair of upper and lower ring gears 18 and 19 are rotatably supported by the chassis 11 around the outer circumference of the lower portion of the drum 1 and are parallel to each other in horizontal planes perpendicular to the axis of the drum 1. The upper and lower ring gears 18 and 19 have outer gear portions 20. Drive gear mechanisms 23 and 24 each comprises a gear 21 engaged with the corresponding gear portion 20 and a worm wheel 22 fixedly connected to the gear 21 by a shaft. In particular, the drive gear mechanisms 23 and 24 are disposed on the chassis 11 such that the upper ring gear 18 meshes with the gear 21 of the drive gear mechanism 23, and the lower ring gear 19 meshes with the gear 21 of the drive gear mechanism 22. The worm wheels 22 of the drive gear mechanisms 23 and 24 mesh with both sides of a worm 27 attached to the motor shaft 26 of a drive motor 25 which is mounted on the chassis 11.

When the guide blocks 2 and 3 are located at the original positions, respectively, the tape guides 8, 9 and 10 of these guide blocks 2 and 3 are at the same level as that of the tape 5 in the tape cassette 4, as shown in FIG. 2. On the other hand, when the guide blocks 2 and 3 are moved to the tape-loaded positions, respectively, the tape guides 8, 9 and 10 of the guide block 2 are at a different level from those of the guide block 3 with respect to the axial direction of the drum 1, as shown in FIG. 3. More specifically, in the tape-loaded positions, the tape guides 8, 9 and 10 of the guide block 2 are at a higher level than that of the tape 5 in the tape cassette 4 and the tape guides 8, 9 and 10 of the guide block 3 are at a lower level than that of the tape 5 in the tape cassette 4. Therefore, the guide rail 12 is inclined upward from the original position to the tape-loaded position of the guide block 2 with respect to the horizontal plane. On the other hand, the guide rail 13 is inclined downward from the original position to the tape-loaded position of the guide block 3 with respect to the horizontal plane. It should be noted that the guide rails 12 and 13 have inclined angles corresponding to that of a helical tape lead 1a formed on the outer circumference of the drum 1.

The guide blocks 2 and 3 are connected to the upper and lower ring gears 18 and 19 through links 29 and 30, respectively. The links 29 and 30 are each arcuately shaped. Front end portions 29a and 30a of the links 29 and 30 engage with pins 32 fitted in arcuate holes 31 formed in the upper and lower ring gears 18 and 19, respectively. Rear end portions 29b and 30b of the links 29 and 30 are bent upwardly into channel shapes and engage with the lower end portions of the guide pins 15 of the guide blocks 2 and 3, respectively. The rear end portion 30b of the link 30 bypasses the upper ring gear 18. Tension springs 34 and 35 are disposed between the front end portions 29a and 30a of the links 29 and 30 and spring stop holes 33 formed in the front sides of the elongated holes 31 of the ring gears 18 and 19, respectively.

In the tape loading apparatus having the construction described above, when the tape cassette 4 is loaded at the cassette loading position shown in FIG. 2, the tape guides 8, 9 and 10 of the guide blocks 2 and 3 located in the original positions are relatively inserted to positions inside the tape 5 of the tape cassette 4, as indicated by imaginary lines in FIGS. 1 and 2. When loading of the tape cassette 4 is completed, the drive motor 25 is automatically driven to rotate in the forward or normal direction, thereby starting the loading operation of the tape 5.

When the motor 25 rotates in the normal direction, the worm wheels 22 of the drive gear mechanisms 23 and 24 are rotated by the worm 27 in the opposite directions to each other. The gears 21 of the drive gear mechanisms 23 and 24 drive the ring gears 18 and 19 though the outer gear portions 20 thereof, respectively. The ring gears 18 and 19 are rotated in the opposite directions as indicated by arrows a and b. As a result, the ring gears 18 and 19 pull the links 29 and 30 through the tension springs 34 and 35 in the directions indicated by the arrows a and b, respectively, so that the links 29 and 30 pull the guide pins 15 of the guide blocks 2 and 3, respectively.

The guide blocks 2 and 3 are slid in the guide grooves 14 along the guide rails 12 and 13 from the original positions in the directions, indicated by arrows c and d, respectively. As a result, the tape guides 8, 9 and 10 of the guide blocks 2 and 3 extract the tape 5 from the tape cassette 4 toward both sides of the drum 1. The guide block 2 is gradually moved upward along the inclined curve of the guide rail 12 with respect to the horizontal plane while the guide block 3 is gradually moved downward along the inclined curve of the guide rail 13 with respect to the horizontal plane, as shown in FIG. 2. The extracted tape 5 is gradually wound (loaded) around the outer circumference of the drum 1 in a substantially $\Omega$-shaped manner. In this time, since inclined angles of the guide rails 12 and 13 correspond to that of the helical tape lead 1a with respect to the horizontal plane, the tape guides 8, 9 and 10 of the guide blocks 2 and 3 are moved along ideal loci corresponding to the helical tape lead 1a. As a result, the tape 5 is ideally loaded around the drum 1 along the tape lead 1a.

When the guide blocks 2 and 3 reach the tape-loaded positions, respectively, index pins 37 and 38 fixed on the guide rails 12 and 13 are engaged with V-shaped grooves 39 formed at the front ends of the carriers 7, respectively. The guide blocks 2 and 3 are then stopped by the index pins 37 and 38 from being pulled by the tension springs 34 and 35, respectively. At the same time, the drive motor 25 is stopped. Thereby, the stop positions of the ring gears 18 and 19 are defined by the self-lock function between the worm 27 and the worm wheels 22. As a result, the tensions of the springs 34 and 35 that press the guide blocks 2 and 3 onto the index pins 37 and 38, respectively, are regulated.

When the guide blocks 2 and 3 are positioned in the tape-loaded positions, as shown in FIG. 3, they are at different levels with respect to the axial direction of the drum 1. As shown in FIG. 1, the tape 5 is helically wound around the drum 1 for an angular interval of nerely 360° along the tape lead 1a in a substantially $\Omega$-shaped manner, thereby completing the tape loading operation.

It should be noted that the extensions of the tape 5 from the guide blocks 2 and 3 to both sides thereof, as shown in FIG. 1, are performed by tension levers (not shown). It should also be noted that the tape 5 is unloaded by rotating the drive motor 25 in the reverse direction in accordance with the reverse procedures to those in the above-mentioned tape loading operation.

However, this conventional tape loading apparatus has the following drawbacks:

(1) In the tape loading operation, the ring gears 18 and 19 are rotated parallel to the horizontal plane, but the guide blocks 2 and 3 are gradually guided upward and downward along the helical tape lead 1a of the drum 1. Thus, the positional relationships in the vertical direction between the ring gears 18 and 19 and the guide blocks 2 and 3 are gradually changed, respectively, and not maintained constant. The level difference between the guide blocks 2 and 3 in the tape-loaded positions must be achieved with use of the links 29 and 30 which connect the guide blocks 2 and 3 to the ring gears 18 and 19, respectively. Therefore, the links 29 and 30 must be pivoted upward and downward at the engaging portions with the engaging pins 32 of the ring gears 18 and 19 and the guide pins 15 of the guide blocks 2 and 3, respectively. As a result, the links 29 and 30 are undesirably stressed. As a result, a considerable difference occurs in the drive forces respectively transmitted from the ring gears 18 and 19 to the guide blocks 2 and 3 through the links 29 and 30. The guide blocks 2 and 3 cannot then be smoothly driven with substantially the same drive force. In addition, a considerable difference also occurs between the forces for pressing the guide blocks 2 and 3 to the index pins 37 and 38 at the tape-loaded positions by means of the elongations of the tension springs 37 and 38 as previously described. When such difference between the pressing forces occurs, the tightening force of the tape 5 onto the drum 1 by the tape guides 8 of the guide blocks 2 and 3 becomes unstable, so the prescribed tightening force cannot be obtained. The tape guides 8 become unsteady during tape travel, so the tape travel becomes unstable. As a result, the recording/reproducing precision is degraded.

(2) Since the relationships between the levels of the ring gears 18 and 19 and the guide blocks 2 and 3 cannot be kept constant during the tape loading operation, the loads acting on the ring gears 18 and 19 become nonuniform. As a result, a problem occurs in the driving of the ring gears 18 and 19 by means of the drive motor 25.

(3) During the tape loading operation, the links 29 and 30 must be pivoted upward and downward with respect to engaging pins 32 of the ring gears 18 and 19 and the guide pins 15 of the guide blocks 2 and 3 as previously described. For this purpose, special hinge structures must be provided to prevent the end portions 29a and 30a of the links 29 and 30 from being vertically removed from the engaging pins 32 and the end portions 29b and 30b of the links 29 and 30 from the guide pins 15 such that the links 29 and 30 can pivot vertically. However, when the end portions 29a and 30a and 29b and 30b of the links 29 and 30 are connected to the engaging pins 32 and the guide pins 16 through such special hinge structures as described above, the assembly operation becomes troublesome. In particular, repair of the apparatus becomes complicated and time-consuming, for example, when the guide rails 12 and 13 have to be replaced.

In order to overcome the conventional drawbacks (1) to (3), the present inventor has examined a tape loading apparatus shown in FIG. 4.

In this case, a ring gear 18 is inclined upward with respect to the horizontal plane and a ring gear 19 is inclined downward with respect to the horizontal plane.

However, the guide rails 12 and 13 are inclined along the helical tape lead of the drum 1 but it is impossible that the inclinations of the ring gears 18 and 19 are completely matched to that of the helical tape lead. In addition to this disadvantage, since the ring gears 18 and 19 are inclined upward and downward with respect to the horizontal plane, drive gear mechanisms 23 and 24 must also be inclined in the opposite directions to each other. As a result, support mechanisms for the ring gears 18 and 19 and the drive gear mechanisms 23 and 24 become very complex, resulting in high cost.

BRIEF SUMMARY OF THE INVENTION

Accordingly, it is an object of the present invention to provide a tape loading apparatus in which the level relationships between a pair of tape guide blocks and a pair of ring gears are kept constant to prevent connecting means between them from being undersirably stressed.

It is another object of the present invention to provide a tape loading apparatus in which a pair of tape guide blocks are connected to a pair of ring gears without complex structures.

It is still another object of the present invention to provide a tape loading apparatus in which a drive mechanism for rotating a pair of ring gears does not need a complex structure.

In accordance with an aspect of the present invention, a tape loading apparatus for extracting a tape from a tape cassette and winding the tape around a rotary head drum comprising:

a pair of tape guide blocks for extracting said tape from said tape cassette and winding said tape around said rotary head drum;

a pair of guide rails for guiding said pair of tape guide blocks along both sides of said rotary head drum, at least one of said guide rails being inclined with respect to a plane perpendicular to the axis of said rotary head drum in order that said pair of tape guide blocks have a level difference at the tape-loaded positions thereof with respect to the axial direction of said rotary head drum;

a pair of upper and lower ring gears rotatably arranged around said rotary head drum for moving said pair of tape guide blocks along said pair of guide rails with the rotations of said ring gears;

a pair of connecting means for connecting said pair of tape guide blocks to said pair of ring gears;

a drive means for rotating said pair of ring gears in the opposite directions to each other; and a parallel movement mechanism for moving at least one of said ring gears along the axis of said rotary head drum so that the level relationships between said tape guide blocks and said ring gears are substantially kept constant while said pair of ring gears rotate in the opposite directions to each other.

The above and other related objects and features of the invention will be apparent from a reading of the following description of the disclosure found in the accompanying drawings and the novelty thereof pointed out in the appended claims.

DETAILED DESCRIPTION OF THE PREFERRED EMBODIMENTS

Figure 1:
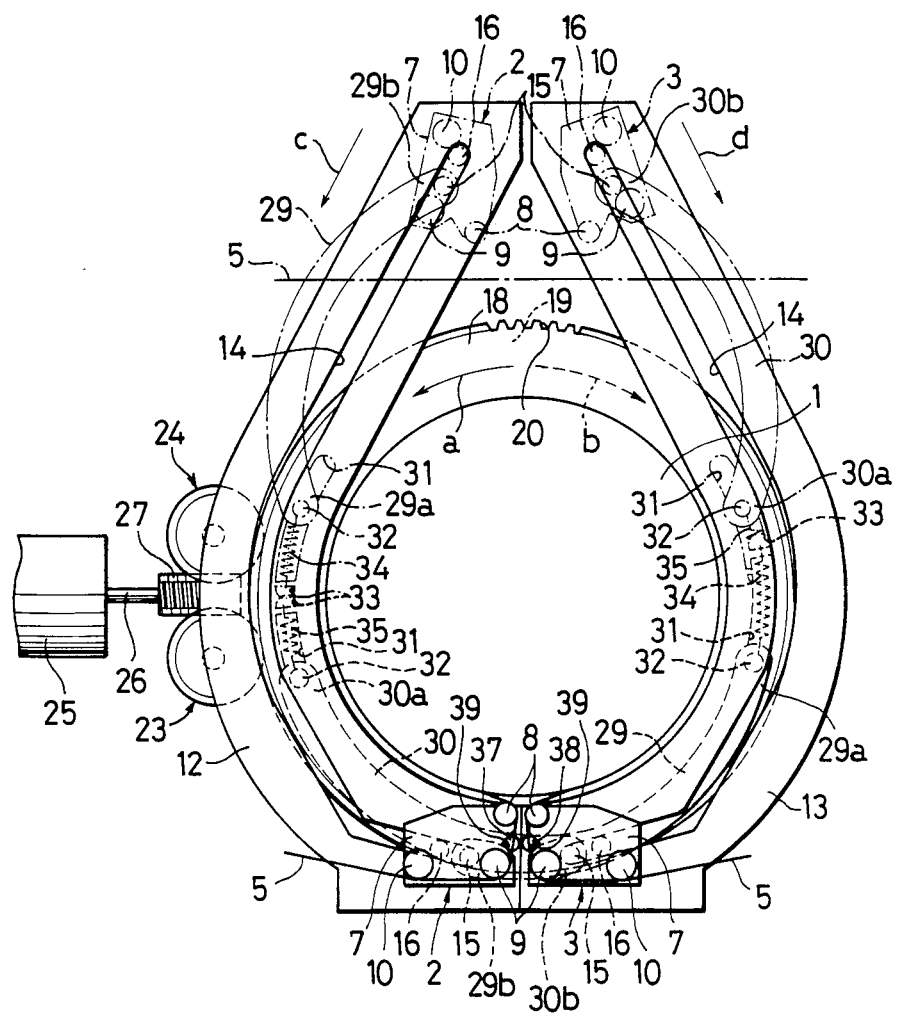
FIG. 1 is a plan view of a tape loading apparatus for a cassette-type video tape recorder known in the prior art and examined by the present inventor to devise the present invention.
Figure 2:
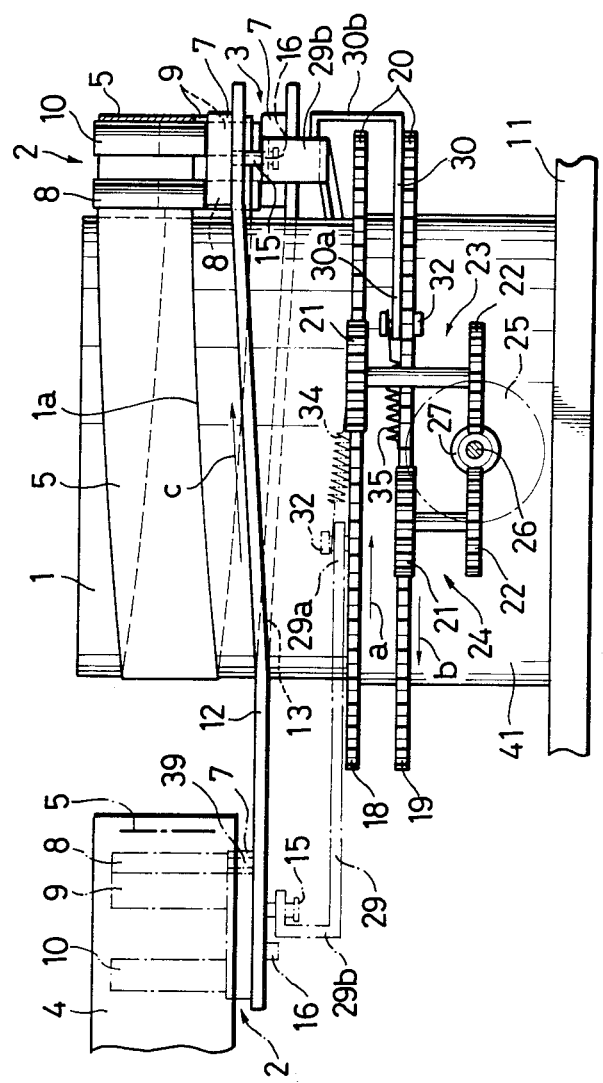
FIG. 2 is a side view of the same.
Figure 3:
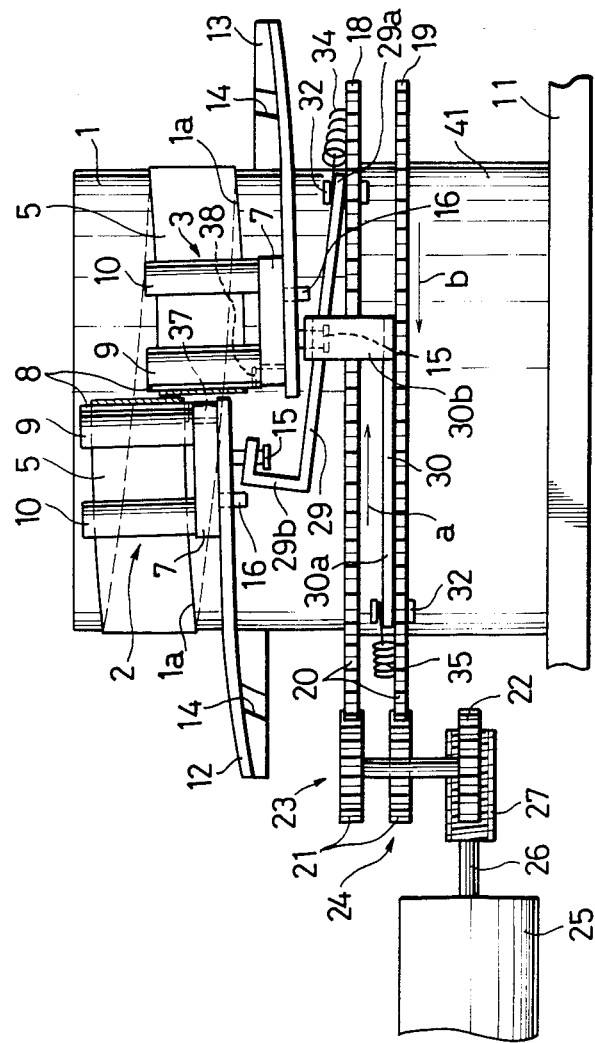
FIG. 3 is a front view of the same.
Figure 4:
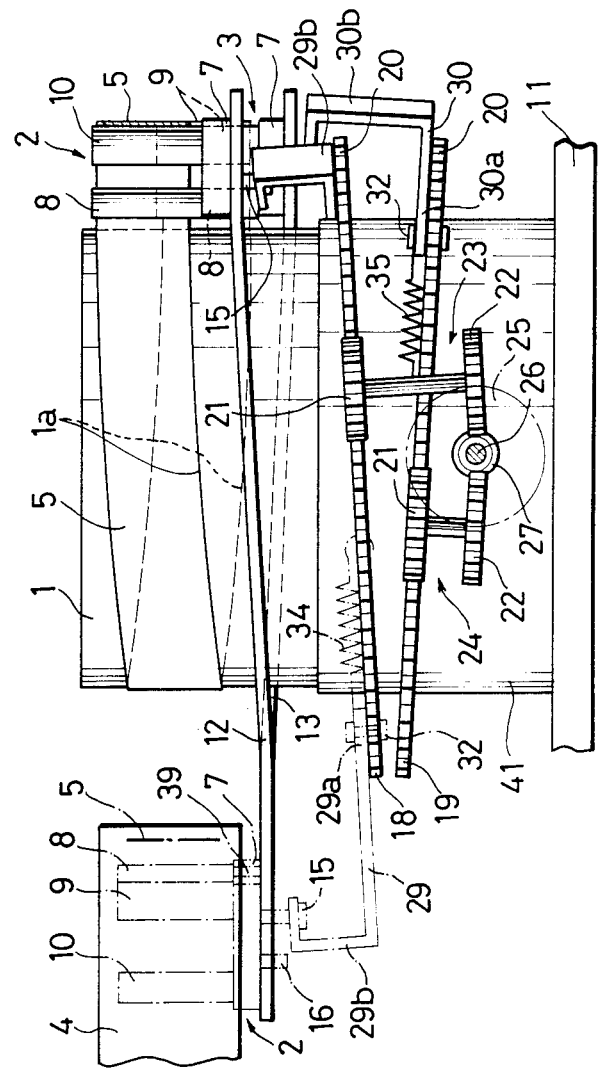
FIG. 4 is a side view of another tape loading apparatus for a cassette-type video tape recorder known in the prior art and also examined by the present inventor to devise the present invention.
Figure 5:
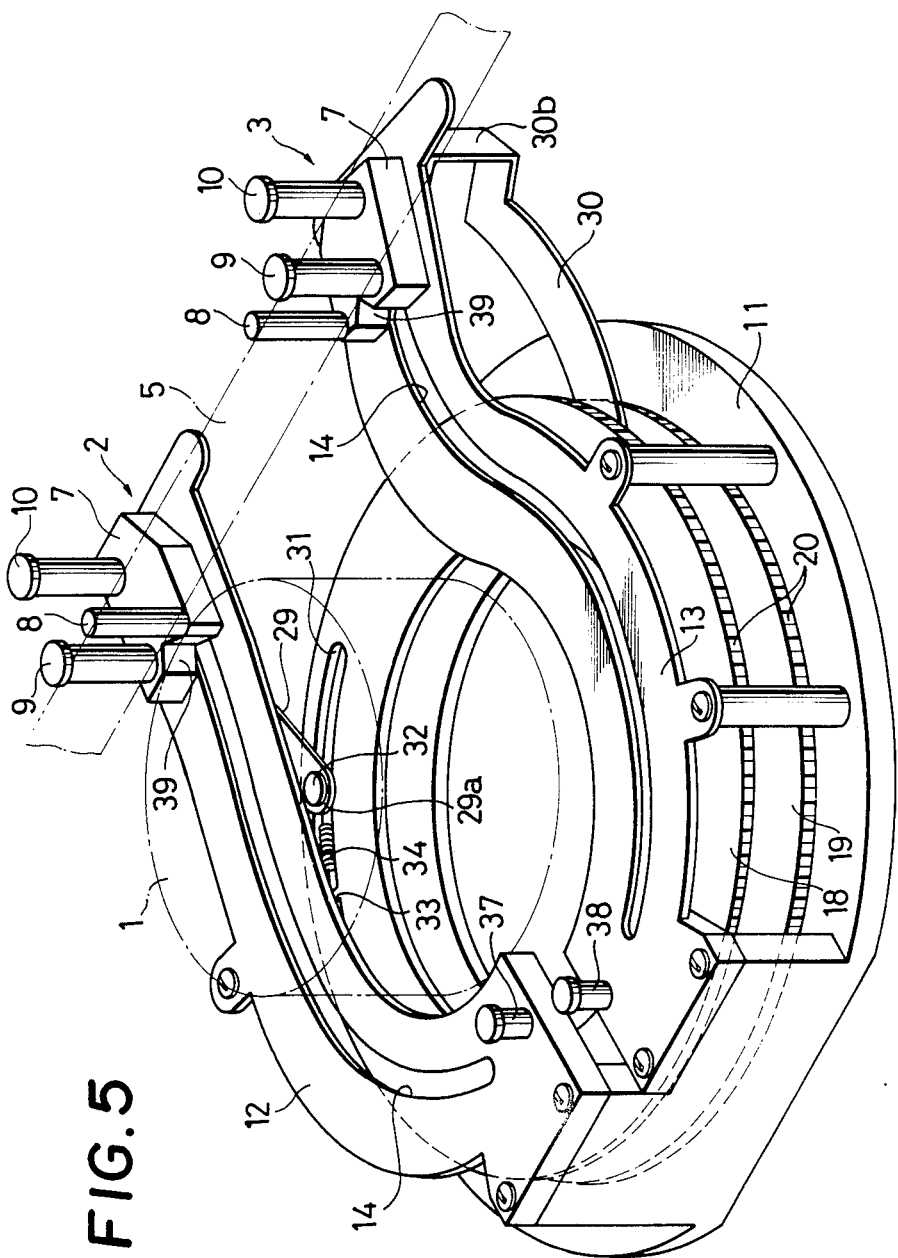
FIG. 5 is a perspective view of a tape loading apparatus for a cassette-type video tape recorder according to the first embodiment of the present invention.

The preferred embodiments will be described in detail with reference to FIGS. 5 to 12 in which the present invention is applied to a tape loading apparatus of a cassette-type video tape recorder. In FIGS. 5 to 12, the same reference numerals as used in FIGS. 1 to 4 denote the same parts in FIGS. 1 to 4, and detailed descriptions thereof will be omitted.

The first embodiment will be described with reference to FIGS. 5 to 10.

Figure 8:
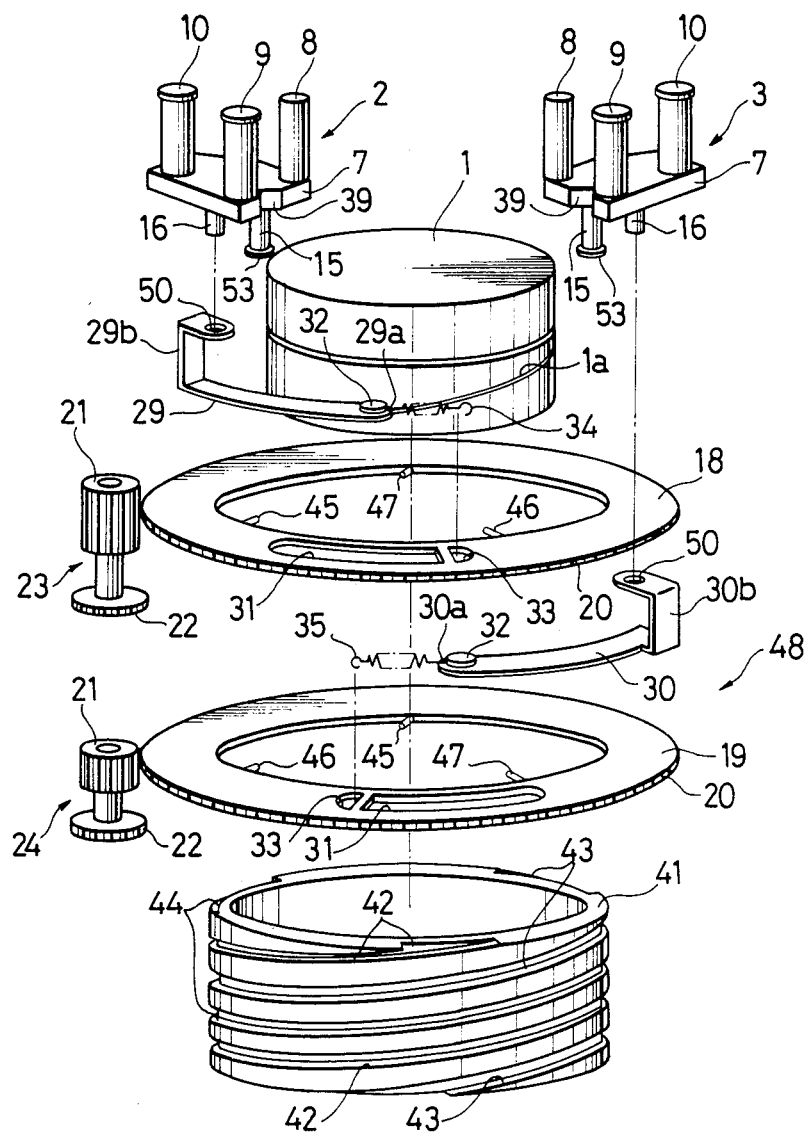
FIG. 8 is an exploded perspective view of a parallel movement mechanism according to the first embodiment.
Figure 9:
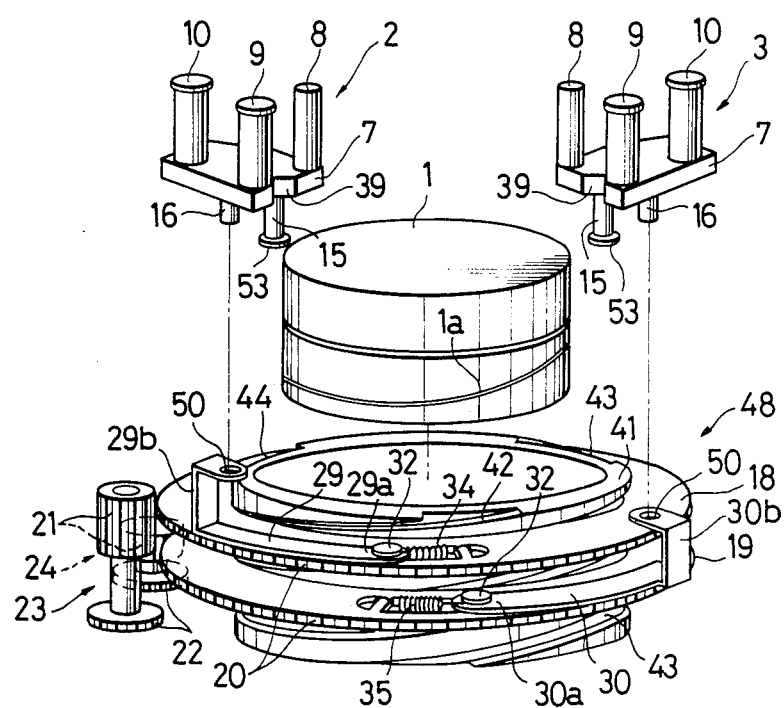
FIG. 9 is a partially exploded perspective view of the same.

As shown in FIGS. 8 and 9, a cylindrical drum base 41 is vertically mounted on a chassis 11 (not shown) so as to coaxially mount a drum 1 thereon. The circumferential surface of the drum base 41 has three helical grooves 42, 43 and 44. The helical grooves 42, 43 and 44 are formed to be parallel with a tape lead 1a formed on the circumferential surface of the drum 1. On the other hand, three guide pins 45, 46 and 47 are fixed on the inner surface of each of ring gears 18 and 19 at an equal angular interval of 120°. The ring gears 18 and 19 are disposed horizontally around the drum base 41 such that the ring gear 18 is parallel to the ring gear 19. The three guide pins 45, 46 and 47 of each of the ring gears 18 and 19 engage with the three helical grooves 42, 43 and 44 of the drum base 41, respectively.

The three helical grooves 42, 43 and 44 and the three guide pins 45, 46 and 47 of each of the ring gears 18 and 19 constitute a parallel movement mechanism 48. When the ring gears 18 and 19 are rotated around the drum base 41, they are vertically moved in accordance with the helical tape lead 1a since the guide pins 45, 46 and 47 are guided by the helical grooves 42, 43 and 44, respectively.

As clearly shown in FIG. 8, gears 21 of the drive gear mechanisms 23 and 24 which are engaged with the outer gear portions 20 of the ring gears 18 and 19 are made of wide gears, widths of which correspond to the vertical displacements of the upper and lower ring gears 18 and 19, respectively. The gears 21 will be described as "wide gears", hereinafter.

Figure 10:
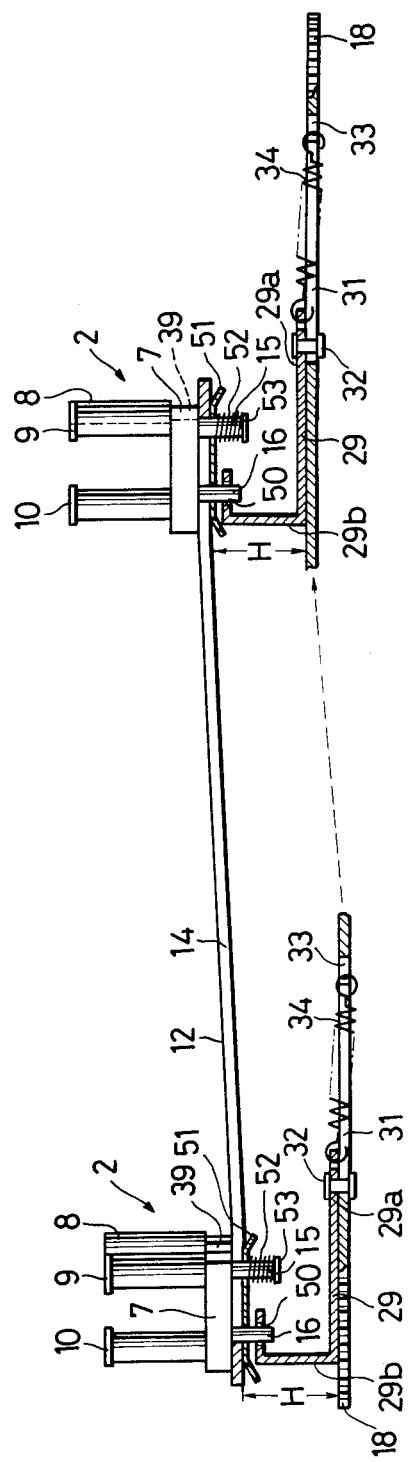
FIG. 10 is a partially sectional view of the same illustrating the relationship between ring gears and tape guide blocks.

As shown in FIG. 10, pin engaging holes 50 which are vertical though holes are formed on the rear end portions 29b and 30b of links 29 and 30, respectively. On the other hand, the guide blocks 2 and 3 are placed on the guide rails 12 and 13 through corresponding carriers 7 and guide pins 15 and 16 extending downward from the lower surface of each of the carrier 7 are inserted in the corresponding guide grooves 14 of the guide rails 12 and 13. In this case, the lower end portions of the guide pins 16 are fitted in the pin engaging holes 50 of the links 29 and 30, respectively. The guide pins 15 and 16 are inserted through holes formed on leaf springs 51 which contact the lower surfaces of the guide rails 12 and 13, respectively. The leaf springs 51 are elastically urged against the lower surfaces of the guide rails 12 and 13, respectively, by compression springs 52 mounted around the lower portions of the guide pins 15. The carriers 7 of the guide blocks 2 and 3 are stably placed on the guide rails 12 and 13 with proper frictional forces by the urging forces of the compression springs 52, respectively. It should be noted that flanges 53 are formed at the lower ends of the guide pins 15 so as to prevent the compression springs 52 from being removed from the guide pins 15.

Figure 6:
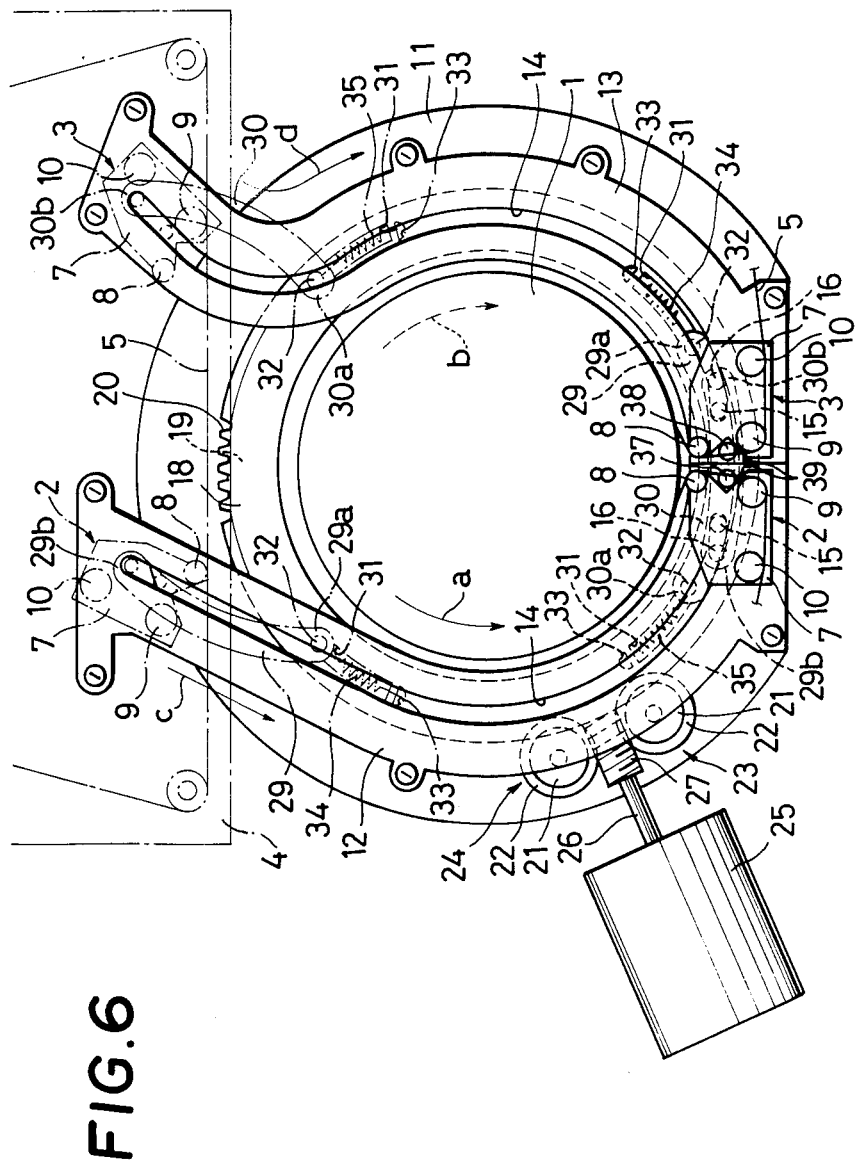
FIG. 6 is a plan view of the same.

The tape loading apparatus according to this embodiment is arranged in the manner as described above. As shown in FIG. 6, the drive motor 25 rotates in the normal direction in the loading of the tape 5 in the same manner as in the conventional case. The ring gears 18 and 19 are rotated in the directions indicated by arrows a and b through the drive gear mechanisms 23 and 24. The guide blocks 2 and 3 are pulled in the directions indicated by arrows c and d through the tension springs 34 and 35 and the links 29 and 30. The guide blocks 2 and 3 are moved along the guide rails 12 and 13 from the original positions indicated by imaginary lines in FIGS. 6 and 7 to the tape-loaded positions indicated by solid lines in FIGS. 6 and 7, thereby loading the tape 5.

In this case, the guide blocks 2 and 3 are moved along both sides of the drum 1 while the blocks 2 and 3 are also moved upward and downward with respect to the horizontal plane on the loci parallel to the helical tape lead 1a of the drum 1. When the guide blocks 2 and 3 reach the tape-loaded positions, they have a predetermined level difference with respect to the axial direction of the drum 1.

Figure 7:
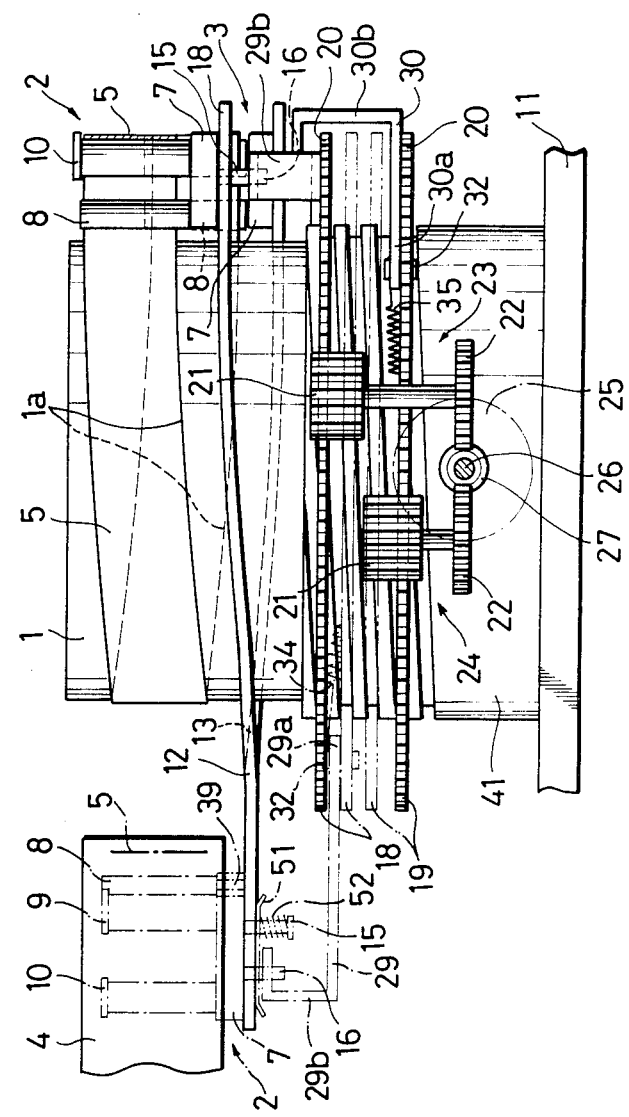
FIG. 7 is a side view of the same.

On the other hand, by the parallel movement mechanism 48, the ring gears 18 and 19 rotating in the opposite directions as indicated by the arrows a and b are moved upward and downward from the original positions indicated by imaginary lines in FIG. 7 to the tape-loaded positions indicated by solid lines in FIG. 7, respectively. In this case, the ring gears 18 and 19 are moved in parallel in accordance with the tape lead 1a of the drum 1. The ring gears 18 and 19 are slidably moved upward and downward with respect to the wide gears 21 of the drive gear mechanisms 23 and 24, respectively.

As shown in FIG. 10, the guide block 2 is gradually moved upward from the original position to the tape-loaded position along the helical tape lead 1a of the drum 1 while the ring gear 18 follows such vertical movement of the guide block 2. That is, the ring gear 18 is also gradually moved in parallel upward along the helical tape lead 1a. Likewise, the guide block 3 is gradually moved downward from the original position to the tape-loaded position along the helical tape lead 1a of the drum 1 while the ring gear 19 follows such movement of the guide block 3, that is, the ring gear 19 is also gradually and moved in parallel downward along the helical tape lead 1a.

According to the tape loading apparatus of this embodiment, the guide blocks 2 and 3 can be moved by the ring gears 18 and 19 such that the level differences H between the ring gears 18 and 19 and the guide blocks 2 and 3 are kept constant, respectively.

The links 29 and 30 are not stressed due to the pivotal movement between the ring gears 18 and 19 and the guide blocks 2 and 3, respectively. The driving forces transmitted from the ring gears 18 and 19 to the guide blocks 2 and 3 through the links 29 and 30 are substantially the same. As a result, the guide blocks 2 and 3 can be smoothly moved with a substantially equal driving force, thereby smoothly loading the tape 5. In addition to this advantage, the forces for pressing the guide blocks 2 and 3 to the index pins 37 and 38 at the tape-loaded positions by means of the elongation of the tension springs 37 and 38 are also substantially the same. Therefore, the prescribed tightening force of the tape 5 can act onto the drum 1 by means of the tape guides 8 of the guide blocks 2 and 3. Thus, the tape guides 8 are prevented from being unsteady during tape travel. As a result, the tape travel becomes stable and so the recording/reproducing precision can be improved.

In addition, since the guide blocks 2 and 3 are moved while the level differences between the ring gears 18 and 19 and the guide blocks 2 and 3, respectively, are kept constant, the loads acting on the ring gears 18 and 19 at the time of the tape loading operation become uniform, thereby loading the tape more smoothly.

Furthermore, since the guide blocks 2 and 3 are moved while the level differences H between the ring gears 18 and 19 and the guide blocks 2 and 3, respectively, are kept constant, the rear end portions 29b and 30b of the links 29 and 30 need not be coupled to the lower end portions of the guide pins 16 of the guide blocks 2 and 3 through special hinge structures. In other words, as shown in FIG. 10, the lower end portions of the guide pins 16 of the guide blocks 2 and 3 are enough to be merely fitted in the pin engaging holes 50 of the rear end portions 29b and 30b of the links 29 and 30, respectively. The assembly operation can thus be simplified. In addition, when the apparatus is disassembled, for example, in order to replace the guide rails 12 and 13, the guide rails 12 and 13 together with the guide blocks 2 and 3 can be lifted upward to disengage the lower end portions of the pins 16 from the pin engaging holes 50 of the links 29 and 30. Therefore, assembly and disassembly is simplified with high efficiency.

Furthermore, when the ring gears 18 and 19 are moved in parallel upward and downward, they are vertically slid on the wide gears 21 of the drive gear mechanisms 23 and 24. The drive gear mechanisms 23 and 24 may be vertically and pivotally supported on the chassis 11 to be parallel to each other. The support structures of the drive gear mechanisms 23 and 24 is thus simplified.

The second embodiment of the present invention will now be described with reference to FIGS. 11 and 12.

A parallel movement mechanism 48 is constructed as follows. Three screw shafts 55, 56 and 57 are vertically mounted on the chassis 11 so as to be disposed around ring gears 18 and 19. Flanged gears 61 and 62 each of which has a pair of upper and lower flanges 59 on its outer circumferential surface are screwed around each of the shafts 55, 56 and 57 to be parallel with each other such that inner threaded portions 58 of the flanged gears 61 and 62 are engaged with outer threaded portions 55a, 56a and 57a of the shafts 55, 56 and 57. Outer gear portion 60 is formed between the upper and lower flanges 59 of each of the flanged gears 61 and 62. Outer gear portions 20 of the ring gears 18 and 19 mesh with the outer gear portions 60 of the flanged gears 61 and 62 of the respective shafts 55, 56 and 57.

Figure 11:
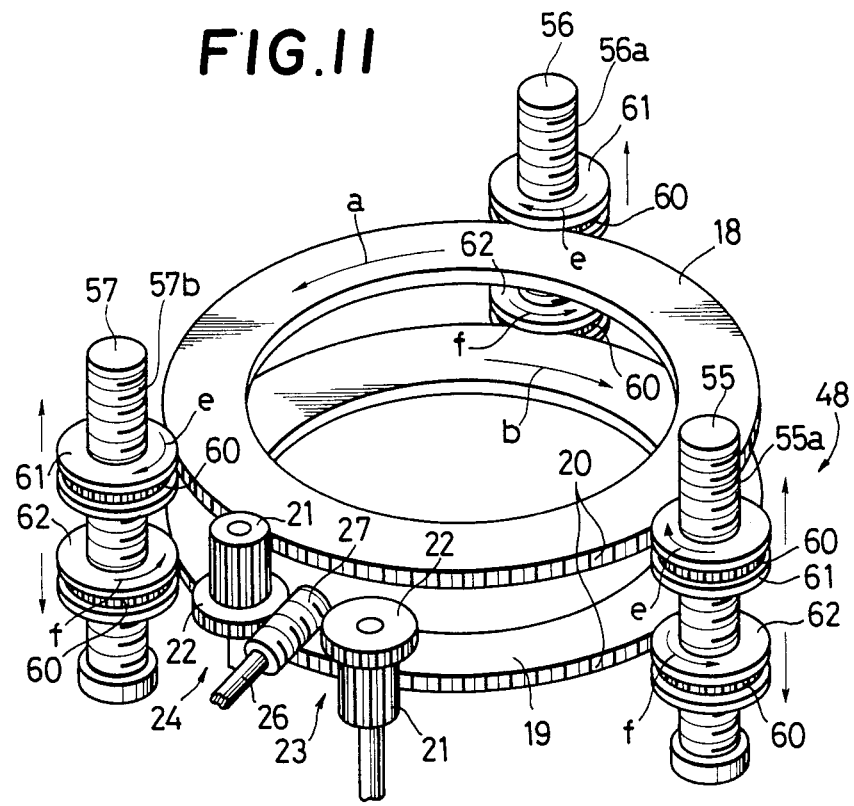
FIG. 11 is a perspective view of a parallel movement mechanism according to the second embodiment of the present invention.
Figure 12:
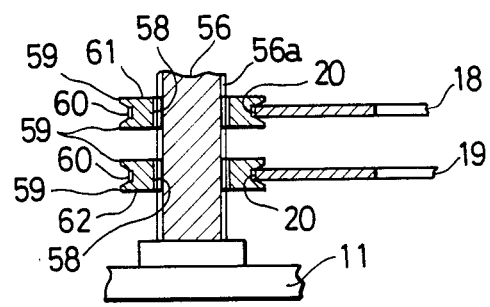
FIG. 12 is a sectional view of the main part of the same.

When the ring gears 18 and 19 are rotated in the opposite directions indicated by arrows a and b in FIG. 11 in the same manner as described above, the outer gear portions 60 of the flanged gears 61 and 62 of the three shafts 55, 56 and 57 are driven by the outer gear portions 20 of the ring gears 18 and 19 in the opposite directions indicated by arrows e and f in FIG. 11, respectively. As a result, by the screw motions due to the engagements between the inner threaded portions 58 of the flanged gears 61 and 62 and the outer threaded portions 55a, 56a and 57a of the shafts 55, 56 and 57, the flanged gears 61 and 62 are moved upward and downward along the shafts 55, 56 and 57. Thus the ring gears 18 and 19 which engage with the flanged gears 61 and 62 respectively are also moved upward and downward to be parallel to each other while they are rotated in the opposite directions. It should be noted that the screw thread pitch of the shafts 55, 56 and 57 is determined in accordance with the inclination of the helical tape lead 1a of the drum 1. Therefore, the ring gears 18 and 19 are moved upward and downward to be parallel to each other along the helical tape lead 1a.

The present invention has been described with the particular embodiments described above. However, the parallel movement mechanisms are not limited to the illustrated ones. In addition, other components can be effectively modified and changed in accordance with the spirit and scope of the invention.

In the above embodiments, the ring gears 18 and 19 are moved upward and downward to be parallel to each other since the guide rails 12 and 13 are inclined upward and downward with respect to the horizontal plane, respectively. However, for example, it is possible that only the guide rail 12 is inclined while the other guide rail 13 is disposed to be horizontal. In this case, only the ring gear 18 is moved upward to be parallel with the ring gear 19 upon rotation of the drum 1 while the ring gear 19 is horizontally rotated at a predetermined position.

What is claimed is:

1. A tape loading apparatus mounted on a chassis for extracting a tape from a tape cassette and winding the tape around a rotary head drum comprising:
   a pair of tape guide blocks for extracting said tape from said tape cassette and winding said tape around said rotary head drum;
   a pair of guide rails for guiding said pair of tape guide blocks along both sides of said rotary head drum, at least one of said guide rails being inclined with respect to a plane perpendicular to the axis of said rotary head drum in order that said pair of tape guide blocks have a level difference at the tape-loaded positions thereof with respect to the axial direction of said rotary head drum;
   a pair of upper and lower ring gears rotatably arranged around said rotary head drum for moving said pair of tape guide blocks along said pair of guide rails with the rotations of said ring gears;
   a pair of connecting means for connecting said pair of tape guide blocks to said pair of ring gears;
   a drive means for rotating said pair of ring gears in the opposite directions to each other; and
   means for moving at least one of said ring gears along the axis of said rotary head drum and maintaining said upper and lower ring gears in mutual parallel relationship, said means for moving being adapted for rotatably supporting said pair of upper and lower ring gears, so that the level relationships between said tape guide blocks and said ring gears are substantially kept constant while said pair of ring gears rotate in the opposite directions to each other.

2. A tape loading apparatus according to claim 1, wherein said parallel movement mechanism comprises:
   at least a helical groove formed on the circumferential surface of a stationary element affixed to said chassis and forming part of said rotary head drum, the inclination of said helical groove corresponding to that of said one or guide rails; and
   at least two projections formed on the inner surface of at least said one of ring gears, said projections slidably engaging with said helical groove so that said one of said ring gears is moved along the axis of said rotary head drum so that said upper and lower gears are in mutual parallel relationship and maintaining the constant level relationship with the corresponding one of said tape guide blocks while said pair of ring gears are rotated by said drive means.

3. A tape loading apparatus according to claim 2, wherein one of said guide rails is inclined upward with respect to the plane perpendicular to the axis of said rotary head drum and the other of said guide rails is inclined downward symmetrically with said upwardly inclined one of guide rails and said projections formed on the inner surface of each of said ring gears engaging with said helical groove of said rotary head drum so that one of said ring gears corresponding to said one of guide rails is moved in parallel upward with respect to the other of said ring gears corresponding to the other of said guide rails that is moved downward along the axis of said rotary head drum for maintaining the level relationships with the corresponding tape guide blocks, respectively, while said pair of ring gears are rotated in the opposite directions to each other by said drive means.

4. A tape loading apparatus according to claim 1, wherein said parallel movement mechanism comprises:
   at least two screw shafts affixed to said chassis and arranged parallel to the axis of said rotary head drum, said screw shafts being arranged outside of said pair of ring gears; and
   at least one flanged gear which is threadedly attached to each of said screw shafts and has an outer gear toothed portion to engage with one of said ring gears, said flanged gear being rotatably movable along said screw shaft so that said one of said ring gears is moved along the axis of said rotary head drum for maintaining the constant level relationship with the corresponding tape guide block while said pair of ring gears are rotated by said drive means.

* * * * *